Figure 1:
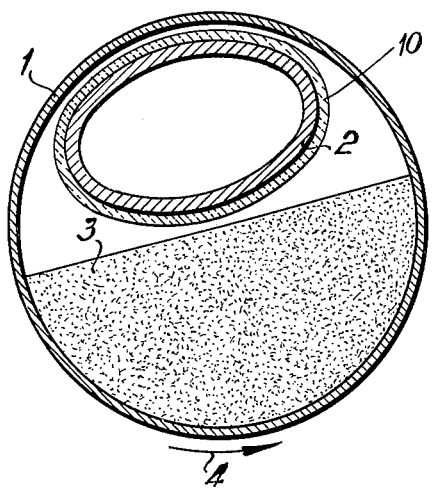

United States Patent Office 3,235,340
Patented Feb. 15, 1966

3,235,340
ROTARY KILN FOR THE MANUFACTURE OF WHITE CALCIUM CYANAMIDE
Franz Kaess, Traunstein, and Hermann Kronacher, Trostberg, Germany, assignors to Suddeutsche Kalkstickstoff-Werke A.G., Trostberg, Germany
Filed Mar. 8, 1961, Ser. No. 94,316
Claims priority, application Germany, Mar. 9, 1960, S 67,507
4 Claims. (Cl. 23—279)

The invention relates to a method and apparatus for the manufacture of white calcium cyanamide by reacting calcium compounds, such as calcium oxide, calcium carbonate, or other calcium compounds forming calcium oxide on heating, with gaseous carbon and nitrogen compounds, especially hydrogen cyanide or mixtures of ammonia and carbon monoxide.

The reaction is well known and is carried out at temperatures of 600 to 900° C. The main difficulty is the ready decomposition of the reacting gases such as hydrogen cyanide or ammonia, which seriously affects the economy of the process.

In order to improve the economy of the process, the German Patent No. 1,034,160 proposes a method of producing white calcium cyanamide in a rotary kiln, where the reaction gases are preheated and then passed through the longitudinal walls of the kiln onto the calcium oxide or calcium carbonate. Said method has the drawback that the perforations of the wall may be clogged with the fine powdered calcium oxide, thereby causing an uneven feed of the reaction gases to the charge. The reaction may even be stopped completely.

We have found that it is not necessary to feed the reaction gases through perforations of the longitudinal kiln walls but that it is possible to let the gases enter into the kiln by an admission line through the front or rear wall of the kiln when the following method is used. Instead of preheating the gases to reaction temperature outside the kiln, the heat for the reaction is supplied by internal heating means. Preferably, a heating tube is used which may be heated electrically or with gas. Thereby, the heating tube should have a higher temperature than the reaction temperature, for instance about 50° C. above said temperature but it is imperative that its temperature does not exceed the reaction temperature by more than 150° C. as otherwise gases like ammonia will be decomposed on the walls of the tube.

Under these conditions, the gases may be admitted in the cold or only slightly preheated state. This has the advantage that only during the reaction, but not before, ammonia is subjected to temperatures where decomposition takes place. At suitable gas velocities and temperatures of the heating tube, the reaction rate of the formation of calcium cyanamide is higher than the decomposition rate of the ammonia, so that the losses of ammonia remain within economically sound limits.

It is of advantage to feed the reaction gases from the rear wall of the kiln in countercurrent to the movement of, and in heat exchange with, the solid material. In this case, in a kiln of suitable length the gases entering at the ambient temperature reach reaction temperature only in the reaction zone proper, preheat the entering cold charge of the solid material, and leave the kiln with relatively low temperature.

According to the invention, the heating means is so arranged that, if the kiln is filled to a high level, the surface radiating heat towards the charge is as large as possible. A high level of the kiln charge and at the same time a great radiating surface is obtained by employing a stationary eccentrically positioned heating tube of elliptic cross section around which the kiln is rotated.

Hereby, it is of advantage to conform the ellipse substantially to the curvature of the kiln wall so as to leave at the upper side only a very small gap for the passage of the gases.

The two halves of the ellipse should be symmetrical so that similar surfaces are opposite the charge and the kiln wall. The side of the heating tube opposite the kiln wall is preferably heat-insulated so as to concentrate the heat radiation towards the open side of the kiln. Such arrangement makes it possible to feed the kiln with a relatively full charge and to obtain a high throughput without immersing the heating tube in the charge. In addition, only a very small free space is left for the reaction gases so that they are forced to pass through the continuously moving solid material and to react therewith. In this manner, calcium cyanamide containing 30 to 33 percent of N can be obtained.

The charge is maintained at reaction temperatures by means of the heat radiating surface of the heating tube, whereby the continuous movement of the charge avoids the risk of overheating. The temperature difference between heating tube and charge should be limited to 100 to 150° C. A still more homogeneous treatment is obtained when the heating gas is recycled so that no flash fires take place and produce overheating.

The reaction may be carried out at normal or elevated pressure.

Figure 2:
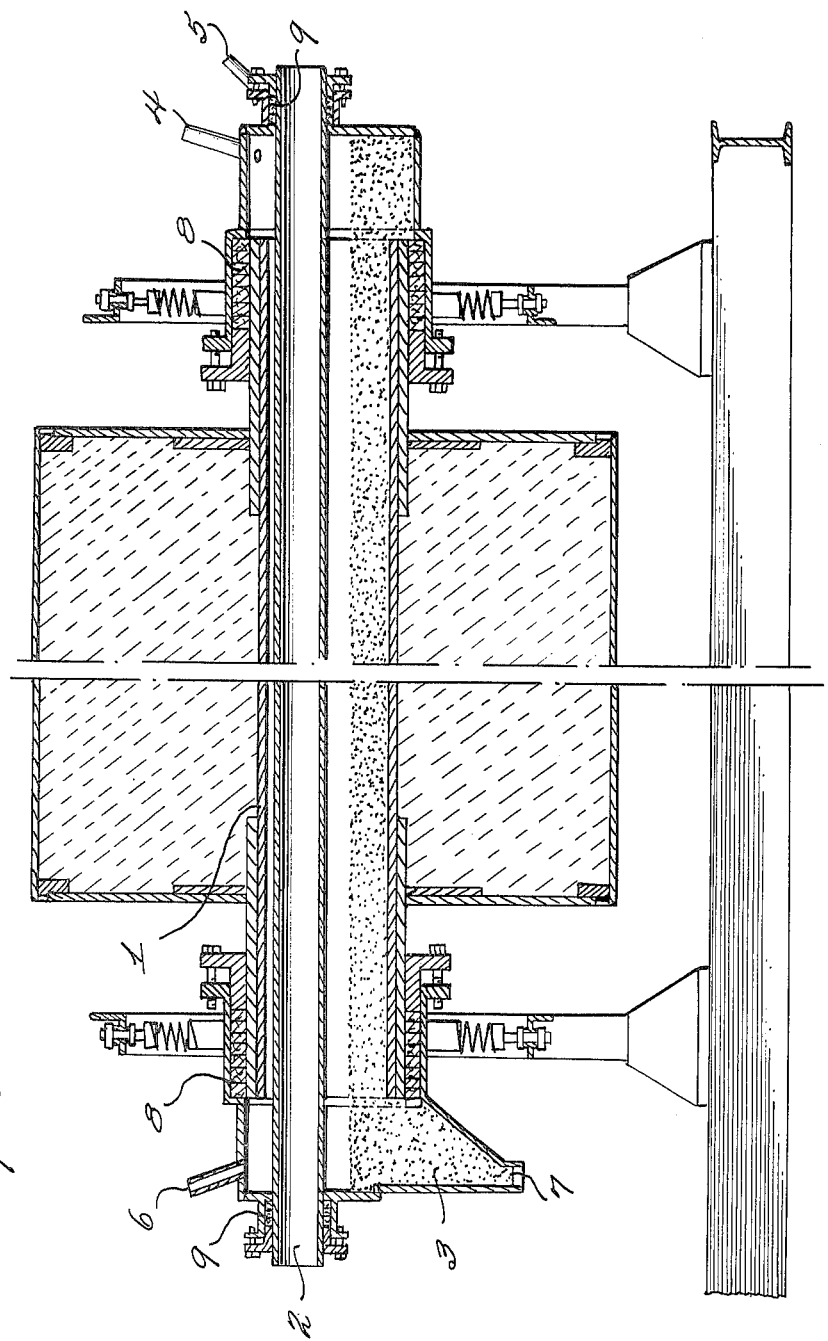

A rotary kiln in accordance with the invention is shown diagrammatically in the accompanying drawings, wherein:

FIG. 1 shows a heating tube of elliptic cross section, where the center of the ellipse is located laterally of, and above, the center of the rotary kiln, and FIG. 2 is a schematic longitudinal cross section of a rotary kiln embodying the arrangement of FIG. 1.

In the drawings, the reference numeral 1 designates the rotary kiln turning around the stationary heating tube 2 in the direction of the arrow 4. The charge 3 enters the kiln at 5 and leaves it at 7, whereas the gases pass in countercurrent to the charge from 6 to 4. The reference numeral 8 shows the gas tight closures of the rotary kiln against the fixed parts of the furnace, and 9 denotes the stuffing boxes for the heating tube.

In FIG. 1, the gently curved part of the elliptic periphery closely conforms to the wall of the kiln in a somewhat concentric spaced relationship thereto and is provided with thermal insulation 10. In this case, the kiln is filled with the charge to its center.

Comparative tests were made by reacting burnt lime of a grain size of 0.1 to 10 mm. in countercurrent with ammonia-carbon monoxide mixtures (1:5) at a temperature of 760° C. in kilns having heating tubes at different locations and of different shapes. The temperature of the heating tube was about 100° C. higher than the temperature of the charge. The used kiln had a diameter of 8 cm., a length of 200 cm., and a capacity of 10 liters.

The other reaction conditions and the results are given in the following table.

Table

| | Central circular heating tube | Circular heating tube in upper portion of kiln | Heating tube as shown in Fig. 1 |
|---|---|---|---|
| Diameter of heating tube, cm | 5 | 5 | 5 and 3.3 |
| Reaction space, liters | 6.1 | 6.1 | 7.5 |
| Height of lime charge, cm | 1 | 2 | 4 |
| Volume of charge, liters | 0.75 | 2 | 5 |
| Free gas space, liters | 5.35 | 4.1 | 2.5 |
| Gas-Lime contact surface, $m^2$ | 0.16 | 0.14 | 0.16 |
| Lime throughput, g./h | 70 | 100 | 150 |
| Gas throughput, l./h | 490 | 720 | 1,000 |
| Residence time of gas, sec | 10 | 5.4 | 2.2 |
| Residence time of lime, h | 10.5 | 20 | 33 |
| $NH_3$ reacted to $CaCN_2$, percent | 19 | 28 | 41 |
| N incorporated of theory, percent | 40 | 70 | 94 |

The apparatus may also be used for other reactions such as hydrogenation and chlorination reactions, addition of CO and $CO_2$, reductions with $H_2$, formation of sulfides from oxides by reaction with $H_2S+CS_2$, and others.

We claim:

1. An apparatus for the manufacture of white calcium cyanamide comprising a rotary kiln, a stationary heating tube of elliptic cross section disposed eccentrically and laterally in the upper half of the kiln in the upper part thereof, and support means maintaining said position of said heating tube during rotation of the kiln.

2. An apparatus as claimed in claim 1 wherein the gently curved part of the elliptic heating tube conforms to the curvature of the wall of the kiln.

3. An apparatus as claimed in claim 1 wherein the wall of the heating tube opposing the wall of the kiln is thermally insulated.

4. An apparatus for heating the solid charge and the gases in heterogeneous gas reactions comprising a rotary kiln, inside said kiln a stationary heating tube for indirect heating of the gases, said tube having an elliptic cross section and being disposed eccentrically and laterally in the upper half of the kiln substantially out of contact with the solid charge, and support means maintaining said position of said heating tube during rotation of the kiln.

References Cited by the Examiner

UNITED STATES PATENTS

| | | | |
|---|---|---|---|
| 245,951 | 8/1881 | Hersey | 165—88 |
| 1,441,351 | 1/1923 | Hindshaw | 266—18 X |
| 1,766,445 | 6/1930 | McKay. | |
| 2,255,539 | 9/1941 | Clarkson | 23—279 |
| 2,637,545 | 5/1953 | Hicguet | 23—279 X |
| 2,832,668 | 4/1958 | Culberson et al. | 23—279 X |
| 2,886,417 | 5/1959 | Kaess et al. | 23—279 |
| 2,917,363 | 12/1959 | Hachmuth et al. | 23—78 |
| 2,924,513 | 2/1960 | Ahimier et al. | 23—279 |
| 2,940,824 | 6/1960 | Kaess et al. | 23—78 |

FOREIGN PATENTS 677,614   8/1952   Great Britain.

MORRIS O. WOLK, *Primary Examiner.*

MAURICE A. BRINDISI, JAMES H. TAYMAN, Jr.,
*Examiners.*